United States Patent
Lemberger

(10) Patent No.: US 7,288,045 B2
(45) Date of Patent: Oct. 30, 2007

(54) FRICTION GEAR FOR A SEPARATE ACCESSORY UNIT IN AN INTERNAL COMBUSTION ENGINE EQUIPPED WITH BELT-DRIVEN AUXILIARY UNITS

(75) Inventor: Heinz Lemberger, Unterfoehring (DE)

(73) Assignee: Bayerische Motoren Werke Aktiengesellscht, Munich (DE)

( * ) Notice: Subject to any disclaimer, the term of this patent is extended or adjusted under 35 U.S.C. 154(b) by 0 days.

(21) Appl. No.: 11/399,649

(22) Filed: Apr. 7, 2006

(65) Prior Publication Data
US 2006/0213317 A1  Sep. 28, 2006

Related U.S. Application Data

(63) Continuation of application No. PCT/EP2004/010108, filed on Sep. 10, 2004.

(30) Foreign Application Priority Data
Oct. 7, 2003 (DE) ................. 103 46 425

(51) Int. Cl.
- F16H 37/02 (2006.01)
- F02B 67/04 (2006.01)
- F02B 67/06 (2006.01)

(52) U.S. Cl. ..................... 476/28; 123/198 R
(58) Field of Classification Search ........ 474/144, 474/151; 476/28, 48, 16, 31; 123/195 C, 123/198 R; 417/364
See application file for complete search history.

(56) References Cited

U.S. PATENT DOCUMENTS

| | | |
|---|---|---|
| 2,823,546 A | 2/1958 | Barrett |
| 3,297,010 A | 1/1967 | Beck |

2006/0264283 A1 * 11/2006 Lemberger .......... 474/135

FOREIGN PATENT DOCUMENTS

| | | |
|---|---|---|
| DE | 39 34 884 A1 | 4/1991 |
| DE | 102 55 073 A1 | 6/2004 |

(Continued)

OTHER PUBLICATIONS http://dictionary.reference.com/search?q=Friction+wheel&r=66.*

(Continued)

*Primary Examiner*—Richard Ridley
*Assistant Examiner*—Terence Boes
(74) *Attorney, Agent, or Firm*—Crowell & Moring LLP

(57) ABSTRACT

A friction gear for a separate accessory of a combustion engine equipped with belt-driven auxiliary units, including a frictional wheel guided by a swivel arm coupled to the engine, to which a protection device is assigned, with the swivel arm and the frictional wheel/protection device provided as a single assembly. The swivel arm provided in the form of a hollow profile includes, on the one hand, a housing which has a single part, flat-cylindrical design and which serves as an essentially closed frictional wheel/protection device with a frictional wheel that can be rotationally mounted between housing end walls and, on the other hand, a coupling location, such that the swivel arm forming a whole with the protective housing and with the coupling location is designed so that it can be assembled over at least one longitudinal partition.

12 Claims, 3 Drawing Sheets

FOREIGN PATENT DOCUMENTS

| | | |
|---|---|---|
| DE | 102 55 074 A1 | 6/2004 |
| DE | 102 55 075 A1 | 6/2004 |
| DE | 103 09 062 A1 | 9/2004 |
| DE | 103 09 061 A1 | 10/2004 |
| DE | 103 09 063 A1 | 10/2004 |
| DE | 103 30 672 A1 | 2/2005 |
| GB | 461603 | 2/1937 |

OTHER PUBLICATIONS

International Search Report dated Nov. 26, 2004 including English Translation of relevant portion (Eight (8) pages).
German Search Report dated Jul. 6, 2004 including English Translation of relevant portion (Four (4) pages).

* cited by examiner

FRICTION GEAR FOR A SEPARATE ACCESSORY UNIT IN AN INTERNAL COMBUSTION ENGINE EQUIPPED WITH BELT-DRIVEN AUXILIARY UNITS

This application is a continuation application of International application PCT/EP2004/010108 filed Sep. 10, 2004 and claims the priority of German application No. 103 46 425.5, filed Oct. 7, 2003, the disclosure of which are expressly incorporated by reference herein.

BACKGROUND OF THE INVENTION

The invention relates to a friction gear for a separate accessory unit in an internal combustion engine equipped with belt-driven auxiliary units, comprising a friction wheel in continuous or controlled drive connection with a drive wheel for the accessory unit, and a belt for a belt drive of the internal combustion engine which the friction wheel contacts or may be brought into contact therewith, whereby the friction wheel, which is held or controllable in/out of the drive connection via a swivel arm coupled on the engine side by means of a control device, is provided with a protective device which is connected to the swivel arm in parts.

Such a friction gear has been proposed in the unpublished German patent application 103 30 672, wherein the swivel arm shown in FIGS. 2 and 3 is designed as shown in the perspective view in FIG. 4 of another German patent application 103 09 061, namely, as a swivel arm having a bearing eye on which two guide levers which support the friction wheel are positioned. As shown in FIG. 2 of the above-cited P 103 30 672, a cover is associated with the guide lever farthest from the engine and is connected as a single piece to the protective housing covering the friction wheel on one side.

SUMMARY OF THE INVENTION

An object of the invention is to refine the swivel arm and friction wheel/protective device to produce a single component that has a simple design and is economically manufactured.

This object is achieved by a swivel arm in the form of a hollow profile which comprises, on the one hand, a housing with a one-piece, integrally molded flat-cylindrical design which serves as an essentially closed friction wheel/protective device having a friction wheel that can be rotationally mounted between housing end walls and, on the other hand, comprises a one-piece, integrally molded coupling point, whereby the swivel arm, which together with the protective housing and the coupling point forms a single unit, is designed so that it can be assembled over at least one longitudinal partition.

The invention advantageously results in a single component having a simple design.

A structure which contributes to the simple design also with respect to high rigidity is achieved in that the protective housing is connected to the coupling point, designed as a bearing eye, via a single arm element of the swivel arm having a hollow profile with a box-shaped, edgewise cross section. Compared to two arm elements, for example, a single arm element provides a flat, compact design.

For a design which produces a favorable power flux in the single arm element, it is further provided that the bearing eye, having a relatively thick bearing wall, is joined as a single piece to the top sides of the hollow profile of the arm element by adapted transitions, and the hollow profile is closed off on the eye side by a circumferentially closed bearing wall, thereby advantageously increasing the torsional rigidity of the arm element in the region of connection to the bearing eye.

Cooperation of the arm element and the protective housing which is advantageous with respect to rigidity is further achieved by the fact that the side boundaries supplementing the top sides of the hollow profile are flush with the end faces of the protective housing, and the top sides of the hollow profile also form rounded transitions to the outer periphery of the protective housing, whereby contact openings for the friction wheel are situated in the housing-side connection regions of the transitions, adjacent to the outer periphery of the housing, with the belt and the accessory unit/drive wheel.

An advantageously rigid protective housing is achieved by a further embodiment of the invention by the fact that recesses coaxial with the friction wheel axis are molded into the end faces of the protective housing, and have spacer rings associated with the interior of the housing which by a threaded connection are braced against an inner bearing ring of the friction wheel. The recesses preferably have the shape of a truncated cone, and are indented in such a way that the threaded connection at either end does not project beyond the end faces of the housing, thus advantageously providing an essentially smooth-surface design of the protective housing.

To achieve proper operation of the friction wheel, according to the previously mentioned German patent application 103 30 672 the protective housing is also designed such that a shearing device which keeps the inlet gap between the friction wheel and the belt substantially free of spun-off particles and liquid droplets is associated with the belt-side contact opening on the outer periphery of the protective housing. In this manner, in particular a liquid film which interferes with the respective friction-fit drive connection during operation of the friction wheel is significantly reduced.

This objective is also achieved by the further feature of the embodiment, according to which the protective housing at a distance from the belt-side contact opening has a radially outwardly situated circumferential section on the outer periphery, in the opposite rotational direction of the friction wheel, which is provided with shear walls oriented in the rotational direction of the friction wheel and at a mutual distance from one another, whereby each of the two end faces of the protective housing is provided with discharge openings between the shear walls for liquid spun off from the rotating friction wheel.

For an advantageously simple production with a simultaneously advantageous highly stress-resistant swivel arm designed as a single unit according to the invention, the swivel arm is formed by a longitudinal partition composed of two essentially half-shells which are detachably or nondetachably connected to one another. As detachable connections, preferably locking connections are considered in which the material selected for the swivel arm has sufficient elasticity, whereby the threaded connection serving as the friction wheel axis provides protection for the particular locking connection.

Integral connections such as welding or soldering may be considered as nondetachable connections, depending on the material selected for the swivel arm, and in addition the swivel arm half-shells may be adhesively bonded together.

With regard to an advantageously simple production with the additional advantage of easily applied reinforcements for increased rigidity, the swivel arm shells in approximate halves are each formed as injection-molded parts from a light metal or a fiber-reinforced plastic, and in particular for increasing the rigidity are integrally connected to one another following prior assembly of the friction wheel, According to the proposal of a hollow profile design of the swivel arm closed off on the protective housing side, a cavity is provided in the arm element of the swivel arm for accommodating one or more separate devices, such as control electronics, a drive element, or a damping or quenching element for the swivel arm according to the invention.

Other objects, advantages and novel features of the present invention will become apparent from the following detailed description of the invention when considered in conjunction with the accompanying drawings for example.

DETAILED DESCRIPTION

Figure 3:
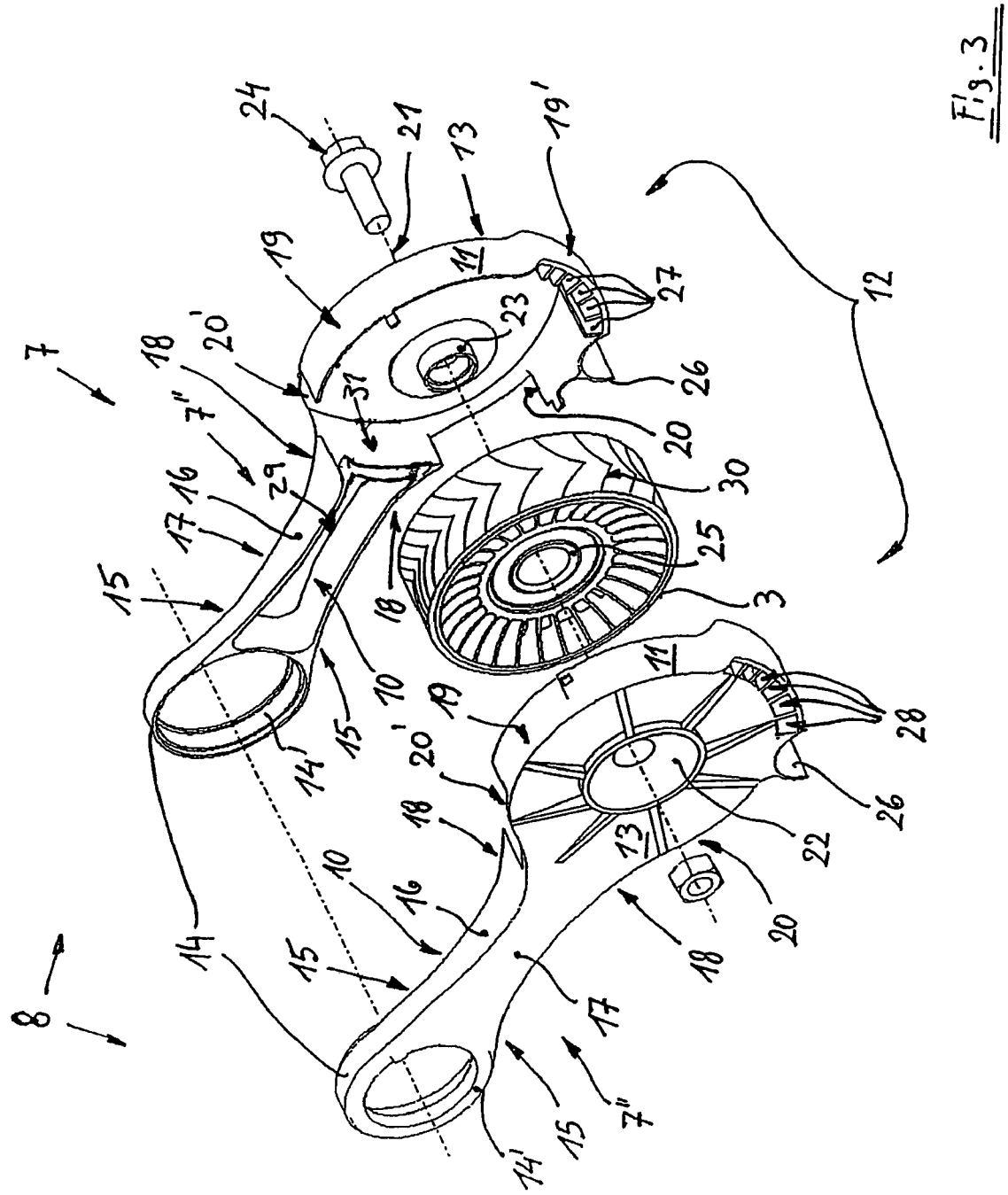

FIG. 3 shows an exploded view of a swivel arm according to an alternative embodiment of the invention designed as a single unit, composed of half-shells with and enclosed hollow profile.

Figure 1:
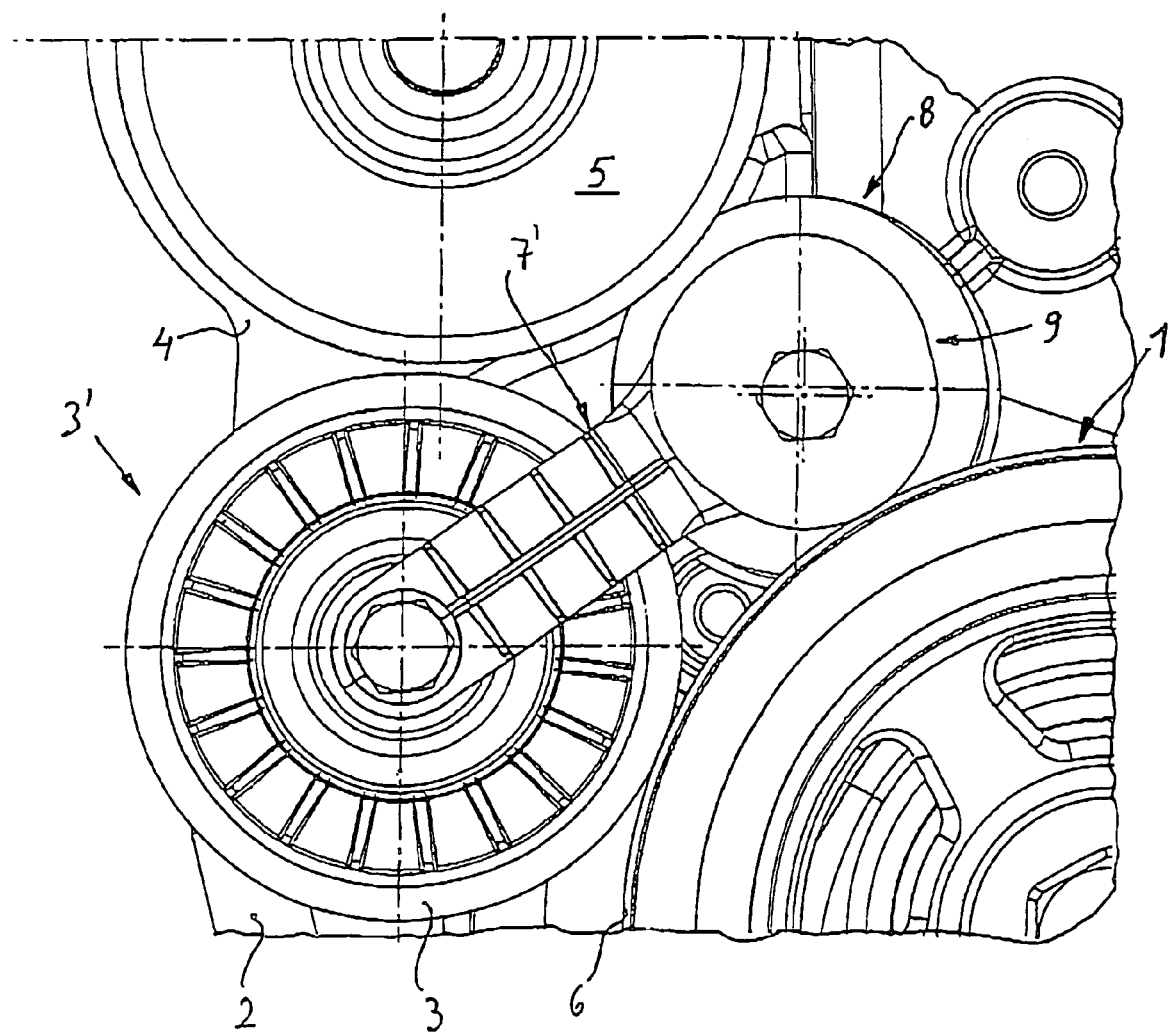
FIG. 1 shows a strictly sectional view of a belt drive having a friction gear for a separate accessory unit in accordance with an embodiment of the present invention, together with a friction wheel disengaged according to the first illustration in the above-cited P 103 30 672.

To facilitate association of the subject matter of the application, FIG. 1 shows an illustration of a belt drive 1 for an internal combustion engine 2, shown in a strictly sectional view, reproduced-according to P 103 30 672, comprising a friction gear 3' for an accessory unit 4 which is provided separately on the internal combustion engine 2 and which preferably is a coolant pump for the cooling circuit of the internal combustion engine 2.

According to FIG. 1 of P 103 30 672, the friction gear 3' shown without regard to the subject matter of the application comprises a friction wheel 3 in continuous or controlled drive connection with a drive wheel 5 for the accessory unit 4, and a belt 6 for the belt drive 1 of the internal combustion engine 2 which the friction wheel 3 contacts or may be brought into contact therewith. The friction wheel 3, which is held or controllable in/out of the drive connection via a fork-shaped swivel arm 7' coupled to the engine by means of a control device 9 which is situated in the coupling point 8 and comprises a torsion spring-loaded eccentric cam, is provided with a protective device according to FIG. 2 of the above-cited P 103 30 672.

In order to refine the swivel arm and friction wheel/protective device to produce a single component that has a simple design and is economically manufactured according to the object of the invention, a swivel arm 7 in the form of a hollow profile 10 comprises, on the one hand, a housing 11 with a one-piece, integrally molded flat-cylindrical design which serves as an essentially closed friction wheel/protective device 12 having a friction wheel 3 that can be rotationally mounted between housing end walls 13 and, on the other hand, comprises a one-piece, integrally molded coupling point 8, whereby the swivel arm 7, which together with the protective housing 11 and the coupling point 8 forms a single unit, is designed so that it can be assembled over at least one longitudinal partition.

Figure 2:
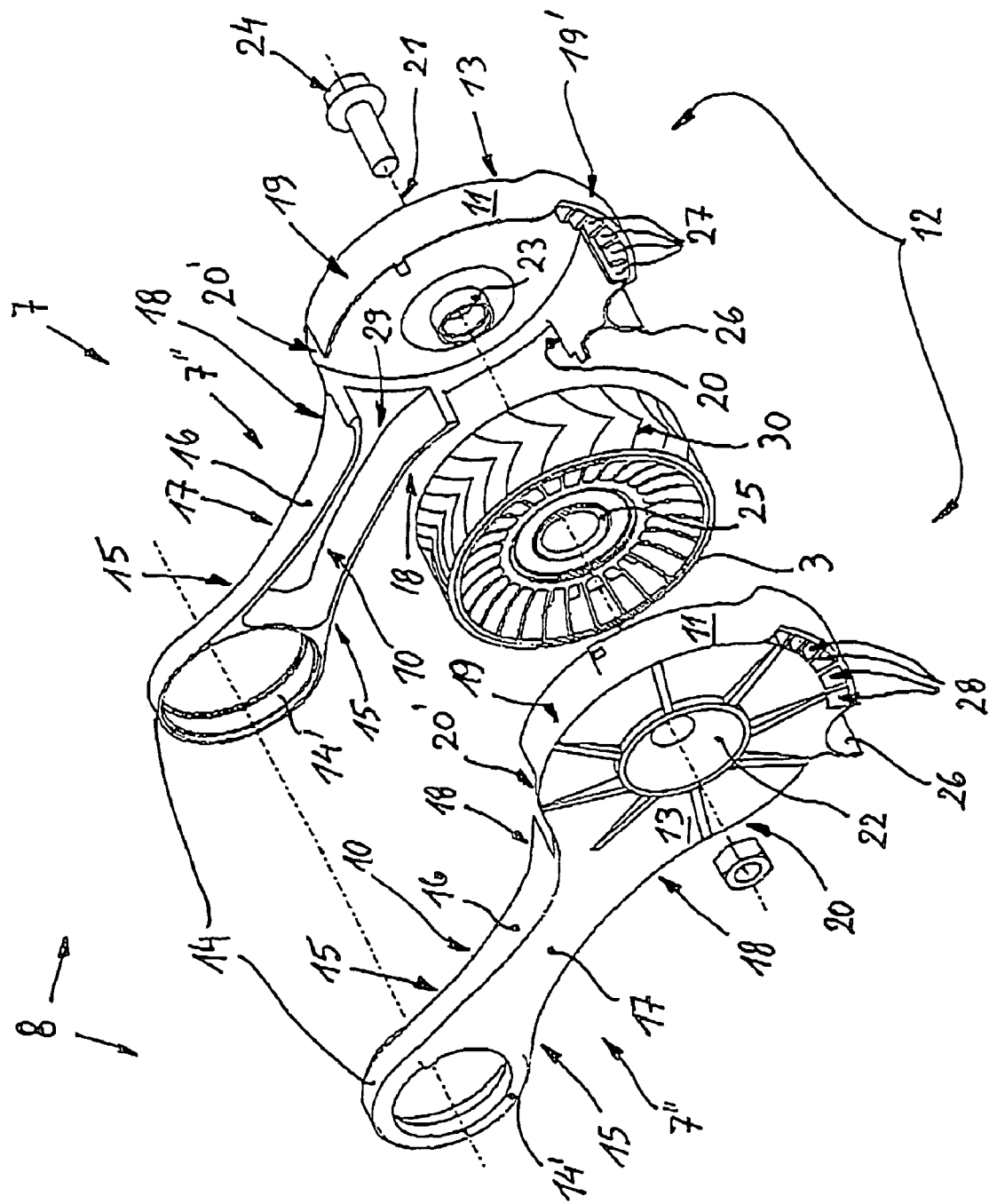
FIG. 2 shows an exploded view of a swivel arm according to an embodiment of the invention designed as a single unit, composed of half-shells.

As shown in FIG. 2, the protective housing 11 is connected via a single arm element 7" of the swivel arm 7 to the coupling point 8 designed as a bearing eye 14, whereby the arm element 7" has a hollow profile 10 with a box-shaped, edgewise cross section for achieving a rigid swivel arm 7.

As a further measure for achieving a rigid swivel arm 7, the bearing eye 14 having a relatively thick bearing wall 14' is joined as a single piece to the top sides 16 of the hollow profile 10 by adapted transitions 15, and the hollow profile 10 is closed off on the bearing eye side via a circumferentially closed bearing wall 14'. This design achieves a torsionally rigid connection of the arm element 7" to the bearing eye 14.

To advantageously transmit in particular tensile stresses from the arm element 7" into the protective housing 11, the side boundaries 17 supplementing the top sides 16 of the hollow profile 10 are flush with the end faces 13 of the protective housing 11. In addition, the top sides 16 form rounded transitions 18 to the outer periphery 19 of the protective housing 11, whereby contact openings 20, 20' for the friction wheel 3 are situated in the housing-side connection regions of the transitions 18, adjacent to the outer periphery 19 of the housing, for friction-fit contact with the belt 6 and the drive wheel 5.

To reinforce the protective housing 11, recesses 22 coaxial with the friction wheel axis 21 are molded into the end faces 13 of the protective housing, and have spacer rings 23 associated with the interior of the housing which by means of a threaded connection 24 are braced against an inner bearing ring 25 of the friction wheel 3.

To ensure a proper friction-fit drive connection of the friction wheel 3 when the belt 6 is loaded with water, a shearing device 26 which keeps the inlet gap between the friction wheel 3 and the belt 6 substantially free of spun-off water droplets is associated with the belt-side contact opening 20 on the outer periphery 19 of the protective housing 11. In order to essentially keep the additional water, which is nevertheless entrained by the friction wheel 3 at the outer periphery, from the inlet gap, the protective housing 11 at a distance from the belt-side contact opening 20 has a radially outwardly situated circumferential section 19' on the outer periphery 19, in the opposite rotational direction of the friction wheel, which is provided with shear walls 27 oriented in the rotational direction of the friction wheel 3 and at a mutual distance from one another. Each of the two end faces 13 of the protective housing 11 is provided with discharge openings 28 between the shear walls 27 for discharging water spun off from the friction wheel 3 against the shear walls 27.

A structure of the swivel arm 7 which contributes to a simple design and economical manufacture and forms a single unit with the coupling point 8 and the protective housing 11 is achieved by an advantageous longitudinal partition which preferably divides the swivel arm 7 into two half-shells 7', 7". The design thereof may be selected so that the shells 7', 7" are provided for a detachable or nondetachable connection.

The manufacture of the swivel arm 7 in a one-piece design according to the invention from two approximate half-shells 70, 70' allows their advantageous production as injection molded parts made of a relatively low-weight material such as a light metal, for example, or a fiber-reinforced plastic. Within the scope of the invention, the shells 70, 70' may also be produced as pressed sheet metal parts. Furthermore, within the scope of the invention, instead of two half-shells 70, 70' only a single shell (not shown) may be provided, the open side of which is closed by a cover.

To achieve a rigid swivel arm 7, the half-shells 70, 70' forming same are integrally connected to one another.

By means of an additional hollow profile closed off on the protective housing side by wall 31 as shown in FIG. 3, the swivel arm 7 according to the invention is provided with an enclosed cavity 29 which may be used for accommodating one or more devices such as a damping or quenching element for the swivel arm 7.

By use of the bearing eye 14, the swivel arm 7 may cooperate with an eccentric cam mounted so as to be rotatable about an axis stationary with respect to the engine, whereby via the swivel arm 7 the eccentric cam, driven by means of a pretensioned torsion spring, maintains the friction wheel 3 in a permanent drive connection with the drive wheel 5 of the accessory unit 4 and the belt 6 of the belt drive 1 for the internal combustion engine 2 according to the subject matter of the application P 102 55 074.

The automatic adjustability of the friction wheel 3 provided by the eccentric cam may be offset in a targeted fashion by a servomotor driven in a controlled manner on the eccentric cam against the effect of the torsion spring for achieving a desired interruption of the previously described drive connection, primarily during, and in a time-limited manner, after, the cold start of a liquid-cooled internal combustion engine 2 to reduce the starting power, and for warming up the internal combustion engine 2 more rapidly by the lack of coolant circulation resulting from the stopped coolant pump acting as accessory unit 4.

Thus, for such a servomotor, P 103 09 063, for example, has proposed an electric stepping motor which is in drive connection with the eccentric cam by means of a gear that is rotatable in both rotational directions without self-locking. A free-wheel device which is rotationally blocked only in the drive direction is provided between this servomotor and the gear in a drive connection in order to achieve a fail-safe function.

In another proposed design of a servomotor, the rotational motion of the eccentric cam is achieved by a lifting motion of the eccentric cam along a steep thread guide. According to the subject matter of P 102 55 075, the lifting motion of the eccentric cam is controlled by an electromagnet. In contrast, according to the subject matter of application P 103 09 061 the lifting motion is achieved by inserting a membrane pressurized by a pneumatic or hydraulic pressure medium.

The German patent application 102 55 073 illustrates and describes a further design of a servomotor, according to which an eccentric cam is designed as a hydraulically impingeable rotary piston.

Lastly, the friction wheel 3 according to P 103 09 062 is provided on the outer periphery with a contact surface made of liquid-repellent rubber, plastic, or elastomer, the contact surface being provided with drainage channels 30 for reducing a liquid deposit. Furthermore, the contact surface of the friction wheel 3 may have a convex design to prevent the friction wheel 3 from running over one of the edges of one of its friction partners as a result of dimensional and production deviations, which could advantageously cause increased weal.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A swivel arm for a separate accessory unit in an internal combustion engine equipped with belt-driven auxiliary units, comprising:
    a friction wheel arranged to be in continuous or controlled drive connection with a belt of a belt drive driving a drive wheel of the accessory unit; and
    a swivel arm coupled on an engine side by a control device which is arranged to hold the friction wheel, the swivel arm being provided with a protective device which is connected to the swivel arm in parts,
    wherein
    the swivel arm is formed as a hollow profile, having at a first end a protective housing with a one-piece, integrally molded flat-cylindrical portion providing an essentially closed friction wheel protective device which houses the friction wheel rotationally mounted therein between housing end walls, and at a second end having a one-piece, integrally molded coupling point, and
    the swivel arm formed as a single unit with the protective housing and the coupling point, is arranged to be assembled over at least one longitudinal partition.

2. The swivel arm according to claim 1, wherein
    the coupling point is arranged as a bearing eye, and
    the protective housing is connected to the coupling point by an arm element of the swivel arm having a hollow profile with a box-shaped, edgewise cross section.

3. The swivel arm according to claim 2, wherein
    the bearing eye has a bearing wall and is joined as a single piece to top sides of the hollow profile of the arm element by adapted transitions, and
    the hollow profile is closed off on an eye side by the bearing wall.

4. The swivel arm according to claim 3, wherein
    side boundaries supplementing the top sides of the hollow profile are flush with end faces of the protective housing,
    the top sides of the hollow profile also form rounded transitions to an outer periphery of the protective housing, and
    at least one contact opening arranged to allow contact between the friction wheel and the belt is situated in housing-side connection regions of the transitions, adjacent to the outer periphery of the protective housing.

5. The swivel arm according to claim 4, wherein
    recesses coaxial with a rotation axis of the friction wheel are formed in end faces of the protective housing,
    spacer rings are provided coaxial with a rotation axis of the friction wheel between the friction wheel and interior walls of the housing, and
    a threaded connection passes through the recesses, spacer rings and an inner bearing of the friction wheel.

6. The swivel arm according to claim 5, wherein
    the outer periphery of the protective housing has a radially outwardly situated circumferential section at a distance from the at least one contact opening,
    the radially outwardly situated circumferential section is provided with shear walls parallel to the rotation axis of the friction wheel and at an equal distance from one another, and
    each of the end faces of the protective housing is provided with discharge openings between the shear walls for release of spun-off liquid from the protective housing.

7. The swivel arm according to claim 4, wherein
a shearing device is provided on the outer periphery of the protective housing to keep the at least one contact opening and the friction wheel substantially free of spun-off particles and liquid droplets associated with belt drive.

8. The swivel arm according to claim 1, wherein
recesses coaxial with a rotation axis of the friction wheel are formed in end faces of the protective housing,
spacer rings are provided coaxial with a rotation axis of the friction wheel between the friction wheel and interior walls of the housing, and
a threaded connection passes through the recesses, spacer rings and an inner bearing of the friction wheel.

9. The swivel arm according to claim 8, wherein
a shearing device is provided on the outer periphery of the protective housing to keep the at least one contact opening and the friction wheel substantially free of spun-off particles and liquid droplets associated with belt drive.

10. The swivel arm according to claim 1, wherein the swivel arm comprises a longitudinal partition formed from two half-shells which are detachably or nondetachably connected to one another.

11. The swivel arm according to claim 10, wherein
the half-shells are each formed as injection-molded parts made of a light metal or a fiber-reinforced plastic and are integrally connected to one another, or
the half-shells are produced as pressed sheet metal parts.

12. The swivel arm according to claim 11, wherein
the hollow profile is closed off on the protective housing side forming a cavity for accommodating one or more separate devices.

* * * * *